United States Patent
Moyer

(10) Patent No.: US 11,755,494 B2
(45) Date of Patent: Sep. 12, 2023

(54) CACHE LINE COHERENCE STATE DOWNGRADE

(71) Applicant: Advanced Micro Devices, Inc., Santa Clara, CA (US)

(72) Inventor: Paul J. Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 18 days.

(21) Appl. No.: 17/514,776

(22) Filed: Oct. 29, 2021

(65) Prior Publication Data

US 2023/0138518 A1 May 4, 2023

(51) Int. Cl.
| | |
|---|---|
| G06F 12/08 | (2016.01) |
| G06F 9/30 | (2018.01) |
| G06F 13/16 | (2006.01) |
| G06F 12/0891 | (2016.01) |
| G06F 12/084 | (2016.01) |

(52) U.S. Cl.
CPC ...... *G06F 12/0891* (2013.01); *G06F 9/30043* (2013.01); *G06F 9/30047* (2013.01); *G06F 12/084* (2013.01); *G06F 13/1668* (2013.01)

(58) Field of Classification Search
CPC ............. G06F 12/0891; G06F 9/30043; G06F 9/30047; G06F 12/084; G06F 13/1668
See application file for complete search history.

(56) References Cited

U.S. PATENT DOCUMENTS

| | | | |
|---|---|---|---|
| 6,425,050 B1 | 7/2002 | Beardsley et al. | |
| 6,457,104 B1* | 9/2002 | Tremaine | G06F 12/08 711/146 |
| 10,831,662 B1 | 11/2020 | Patidar et al. | |
| 2004/0003182 A1 | 1/2004 | Cypher | |
| 2006/0174228 A1* | 8/2006 | Radhakrishnan | G06F 9/30047 712/E9.055 |
| 2007/0079074 A1 | 4/2007 | Collier et al. | |
| 2015/0081984 A1 | 3/2015 | Blankenship et al. | |
| 2015/0347302 A1* | 12/2015 | Hagersten | G06F 12/0811 711/140 |

* cited by examiner

Primary Examiner — Masud K Khan
(74) Attorney, Agent, or Firm — Volpe Koenig

(57) ABSTRACT

Techniques for performing cache operations are provided. The techniques include for a memory access class, detecting a threshold number of instances in which cache lines in an exclusive state in a cache are changed to an invalid state or a shared state without being in a modified state; in response to the detecting, treating first coherence state agnostic requests for cache lines for the memory access class as requests for cache lines in a shared state; detecting a reset event for the memory access class; and in response to detecting the reset event, treating second coherence state agnostic requests for cache lines for the memory class as coherence state agnostic requests.

20 Claims, 6 Drawing Sheets

CACHE LINE COHERENCE STATE DOWNGRADE

BACKGROUND

Modern microprocessors implement a wide array of features for high throughput. Cache performance is of particular importance to performance. Improvements to such features are constantly being made.

BRIEF DESCRIPTION OF THE DRAWINGS

A more detailed understanding may be had from the following description, given by way of example in conjunction with the accompanying drawings wherein.

DETAILED DESCRIPTION

Techniques for performing cache operations are provided. The techniques include for a memory access class, detecting a threshold number of instances in which cache lines in an exclusive state in a cache are changed to an invalid state or a shared state without being in a modified state; in response to the detecting, treating coherence state agnostic requests for cache lines for the memory access class as requests for cache lines in a shared state; detecting a reset event for the memory access class; and in response to detecting the reset event, treating coherence state agnostic requests for cache lines for the memory class as coherence state agnostic requests.

Figure 1:
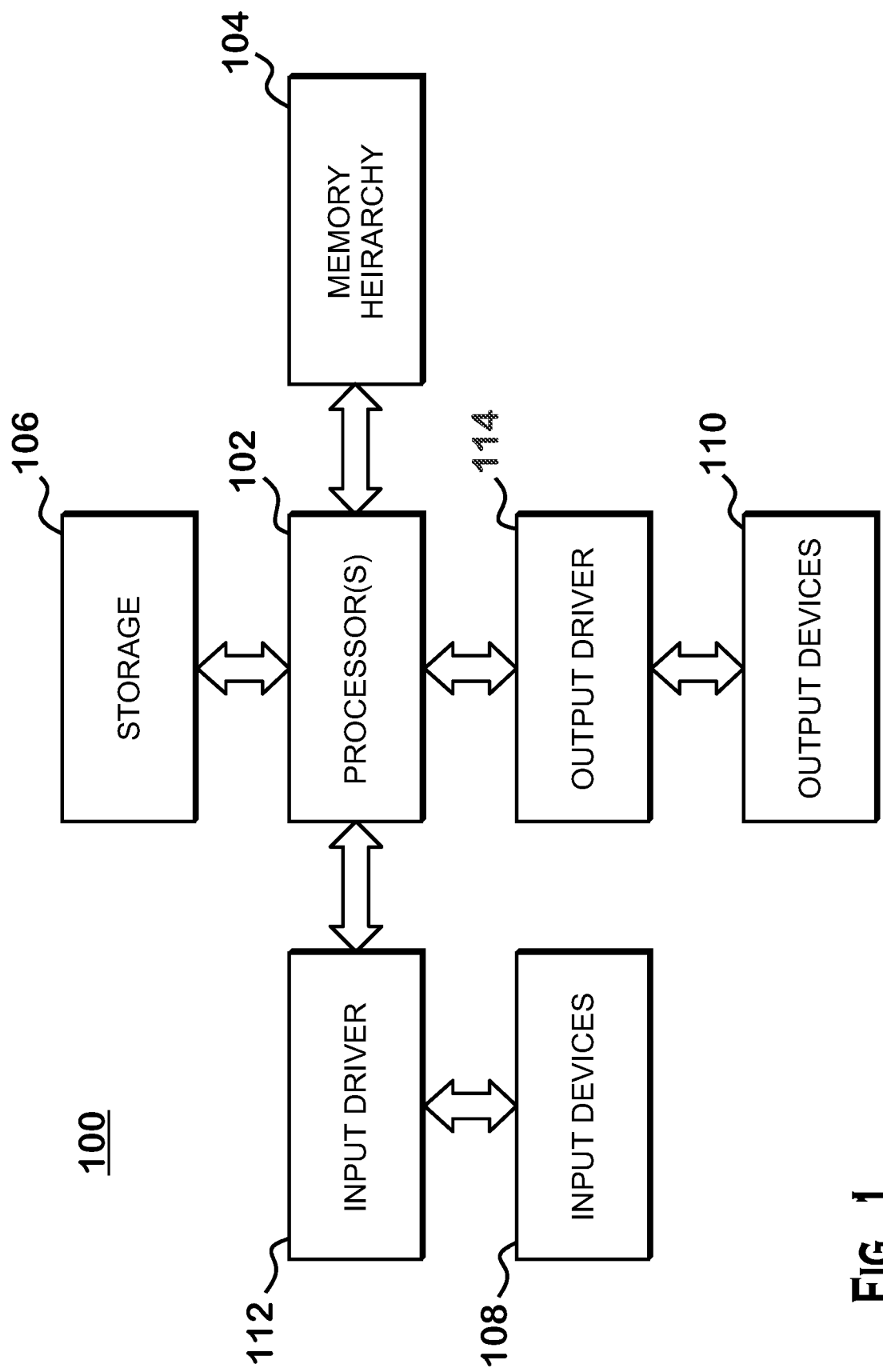
FIG. 1 is a block diagram of an example device in which one or more disclosed embodiments may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes one or more processors 102, a memory hierarchy 104, a storage device 106, one or more input devices 108, and one or more output devices 110. The device 100 may also optionally include an input driver 112 and an output driver 114. It is understood that the device 100 may include additional components not shown in FIG. 1.

The one or more processors 102 includes a central processing unit (CPU), a graphics processing unit (GPU), a CPU and GPU located on the same die, or one or more processor cores, wherein each processor core is a CPU or a GPU. In some examples, the one or more processors 102 includes any number of processors. In some examples, the one or more processors 102 includes one or more processor chips. In some examples, each processor chips includes one or more processor cores.

Part or all of the memory hierarchy 104 may be located on the same die as one or more of the one or more processors 102, or may be located partially or completely separately from the one or more processors 102. The memory hierarchy 104 includes, for example, one or more caches, one or more volatile memories, one or more non-volatile memories, and/or other memories, and may include one or more random access memories ("RAM") of one or a variety of types.

In some examples, the elements of the memory hierarchy 104 are arranged in a hierarchy that includes the elements of the one or more processors 102. Examples of such an arrangement is provided in FIGS. 3 and 4A-4D.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
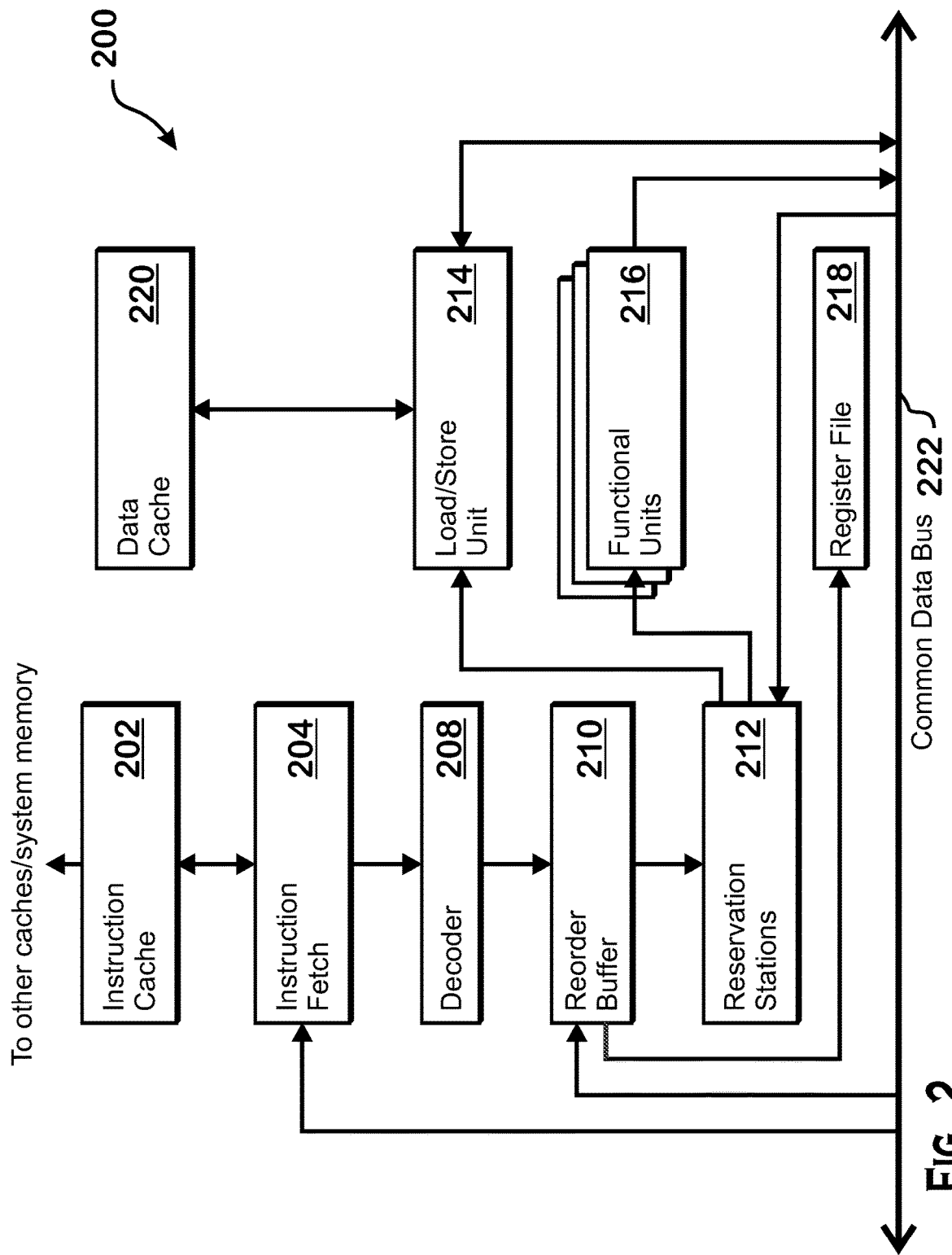
FIG. 2 is a block diagram of an instruction execution pipeline, located within the processor of FIG. 1.

FIG. 2 is a block diagram of an instruction execution pipeline 200, located within the one or more processors 102 of FIG. 1. In various examples, any of the processor cores of the one or more processors 102 of FIG. 1 are implemented as illustrated in FIG. 2.

The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 configured to fetch instructions from system memory (such as memory 104) via an instruction cache 202, a decoder 208 configured to decode fetched instructions, functional units 216 configured to perform calculations to process the instructions, a load store unit 214, configured to load data from or store data to system memory via a data cache 220, and a register file 218, which includes registers that store working data for the instructions. A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet had results committed to the architectural state of the processor (e.g., results written to a register file, or the like). Reservation stations 212 maintain in-flight instructions and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer queue 210. Retirement refers to the act of committing results of an instruction to the architectural state of the processor. For example, writing an addition result to a register, by an add instruction, writing a loaded value to a register by a load instruction, or causing instruction flow to jump to a new location, by a branch instruction, are all examples of retirement of the instruction.

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

Figure 3:
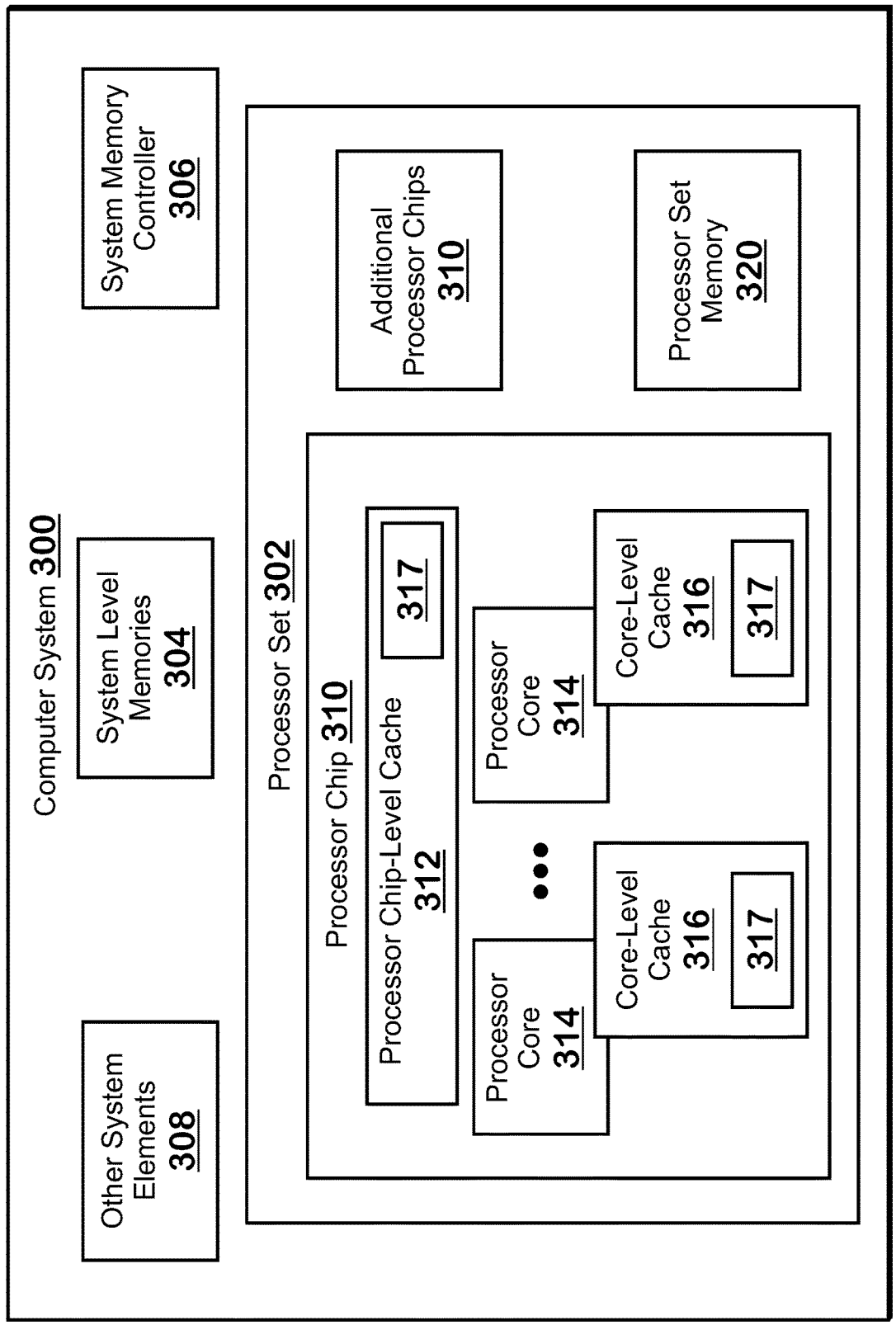
FIG. 3 is a block diagram of a computer system, according to an example.

FIG. 3 is a block diagram of a computer system 300, according to an example. In some examples, the computer system 300 is the computer system 100 of FIG. 1. The computer system 300 includes a processor set 302, one or more system-level memories 304, a system memory controller 306, and other system elements 308.

The processor set 302 includes one or more processor chips 310. Each processor chip 310 includes a processor chip-level cache 312 and one or more processor cores 314. Each processor core 314 has an associated core-level cache 316. Each of the processor cores 314 includes one or more execution pipelines such as the instruction execution pipeline 200 of FIG. 2.

The caches and memories illustrated in FIG. 3 operate in parallel and therefore use a coherence protocol to ensure data coherence. One example of such a protocol is the modified-exclusive-shared-invalid ("MESI") protocol. Each cache line can be in one of the four states of modified, exclusive, shared, or invalid. Each cache line includes an indication of one of these four states. This indication indicates which of the four states the cache line is in. The modified state indicates that the copy of the cache line that exists in a particular cache is modified with respect to the copy that exists in a backing memory, and thus that the cache line must be written to the backing memory when the cache line is evicted. The exclusive state indicates that the cache line is in a particular cache and not in any other cache at the same level of the hierarchy. It should be noted that a cache line that is marked as exclusive can be located in a higher level of the hierarchy. For example, a cache line in a level 0 cache in an exclusive state can also be in the level 1 cache directly above the level 0 cache. The shared state indicates that the cache line is in multiple caches at the same level of the hierarchy. The invalid state indicates that the cache line is not valid within the particular cache where that cache line is marked invalid (although another cache can have a valid copy of that cache line).

Each processor core 314 has an associated core-level cache 316. When a processor core 314 executes a memory operation such as a load operation or a store operation, the processor core 314 determines whether the cache line that has the data for the memory operation is located within the core-level cache 316 associated with the processor core 314. If such a cache line is not located within the core-level cache 316, then the core-level cache 316 attempts to fetch that cache line into that core-level cache 316 from a higher level cache such as the processor chip-level cache 312. The processor chip-level cache 312 serves both as a higher level cache memory and as a controller that manages the coherence protocol for the processor chip-level cache 312 and all core-level caches 316 within the same processor chip 310. Thus the processor chip-level cache 312 checks itself to determine whether the requested cache line is exists therein for the purpose of providing that cache line to the requesting processor core 314. The processor chip-level cache 312 provides the cache line to the requesting core 314 either from its own contents or once fetched from a memory that is higher up in the hierarchy.

The processor chip-level cache 312 manages the coherence protocol for the core-level caches 316. In general, the processor chip-level cache 312 manages the protocol states of the cache lines within the core-level caches 316 so that if any cache line is in an exclusive state in a particular core-level cache 316, no other core-level cache 316 has that cache line in any state except invalid. Multiple core-level caches 316 are permitted to have the cache line in a shared state.

The protocol works on a level-by-level basis. More specifically, at each level of the memory hierarchy, each element within that level is permitted to have a cache line in some subset of the states of the protocol. In an example, at the level of the processor set 302, each chip 310 (thus, each processor chip-level cache 312) is permitted to have a cache line in one of the states, such as a shared state or an exclusive state. A controller for a particular level of the hierarchy manages the protocol at that level. Thus the processor set memory 320 manages the states of the processor chip-level caches 312. The processor chip-level cache 312 for any particular processor chip 310 manages the states of the core-level caches 316, and a system memory controller 306 manages the states for the processor set 302 and other system elements 308 that may have a particular cache line.

As stated above, a cache controller controls the coherence state for cache lines. Various memory access instruction types, such as loads and stores, result in different behavior related to these coherence states. In general, when a processing core 314 executes some types of instruction in certain circumstances, the processing core 314 generates traffic that causes the targeted cache line (i.e., the cache line containing the data accessed by the memory access instruction) to be in an associated cache (e.g., the core-level cache 316) in a particular coherence state. In some examples, the memory access instruction targets a cache line that is not currently in a cache such as the core-level cache 316, which therefore results in a cache miss. Thus the cache controller or other entity services this request by storing the cache line in the cache (e.g., the core-level cache 316) with a particular coherence state. For some memory access requests, part of servicing a miss includes the processing core 314 making a request that the cache line be placed into the cache in a coherence state agnostic manner. In an example, the processing core 314 determines that the cache does not have the cache line and requests the cache obtain the cache line in any coherence state.

In some situations, the cache controller services a coherence state agnostic request for a cache line by bringing the cache line into the cache in a shared state. In other situations, the cache controller services a coherence state agnostic request for a cache line by bringing the cache line into the cache in an exclusive state. In some examples, this activity occurs where the cache controller determines that there is no contention for the cache line (e.g., where no other processor core 314 or other element requires access to the cache line). In some situations, this results in significant inefficiencies. For example, if the cache line is never actually needed in an exclusive state, but is subsequently needed by a different processor core 314, then the work associated with modifying the coherence state from exclusive to another state such as invalid or shared can be considered to be wasted. For example, in the event that a cache line in an exclusive state in one core-level cache 316 is required by another processor core 314 in a shared state, the other processor core 314 (or an associated cache controller) sends a probe to the cache storing the cache line, to indicate that the cache line should be in a shared state. In response to the probe, the cache converts the cache line into a shared state. This probe and cache line state conversion represents additional, unnecessary work as compared with a situation in which the cache line had originally come into the cache in a shared state in response to the state agnostic request.

For at least the above reasons, techniques are presented herein for reducing instances in which memory accesses that would generate coherence state agnostic requests for cache lines instead generate requests for cache lines in a shared state, in situations where such requests are predicted not to need such cache lines in an exclusive state. In general, the techniques include maintaining memory access metadata 317 that tracks "classes" of memory accesses (also sometimes referred to as "memory access class"). A cache controller uses the memory access metadata 317 to determine whether to change a metadata state agnostic request for access to a cache line to a request for the cache line in a shared state.

The cache controller maintains the memory access metadata 317, storing information for multiple "classes" of memory access. Each class represents a type of memory access. The definition of a class includes one or more of access type and thread id, and, optionally, other information. The access type indicates the type of the operation whose execution resulted in the memory access request. Some examples of operation types include instruction type, which can include one or more types of loads, one or more types of stores, one or more types of pre-fetches, one or more types of atomic operations, or other types. Some other examples of operation types include hardware-based operations, such as hardware-initiated prefetch operations. Any other technically feasible operation type is a possible access type. The definition of a class also includes the thread identifier ("ID"), which identifies a particular processor execution thread. As should be understood by those of ordinary skill in the art, the processors of the system 100, such as the processor cores 314, are capable of executing different execution threads, each of which represents a software program or portion of a software program having independent control flow. The combination of access type and thread ID defines a class. In some implementations, the definition of a class also includes one or more other features.

The cache controller maintains the memory access metadata 317, by maintaining, for each class, a request downgrade decision factor. The request downgrade decision factor indicates whether the cache controller should modify a coherence state agnostic request to insert a cache line in a core-level cache 316 into a request to insert a cache line in a core-level cache 316 in a shared state. In some examples, the downgrade decision factor is a count that counts the number of times that a cache line is in an exclusive state and brought to a shared state or an invalid state without ever being changed to a modified state.

In an example, a memory access instruction executed by a processor core 314 results in the processing core 314 generating a coherence state agnostic request that requests the cache controller to bring the cache line into the cache. The cache controller examines the memory access metadata 317 for the class associated with the memory access instruction and determines that metadata state agnostic requests for cache lines for that class should be downgraded to requests for cache lines in a shared state. In response to this determination, the cache controller causes the cache line to be brought into the core-level cache 316 in a shared state.

In another example, a memory access instruction executed by a processor core 314 results in the processing core 314 generating a coherence state agnostic request that requests the cache controller to bring the cache line into the cache. The cache controller determines that the associated class does not have an indication that coherence state agnostic requests should be downgraded to shared state requests. In response, the cache controller causes the cache line to be brought into the cache in a coherence state agnostic manner. This means that the cache controller is free to bring the cache line in a shared state or in an exclusive state (or potentially in other states as the coherence protocol allows).

As stated, the cache controller maintains the metadata memory 317 which indicates, for various different classes, an indication of whether to convert coherence state agnostic requests accesses to shared access requests. To do this, the cache controller monitors instances of unnecessarily bringing cache lines into the cache in an exclusive state, for the various different classes. In the event that the cache controller deems there to have been a number of such instances that is greater than a threshold for a given class or group of classes, the cache controller causes the metadata memory 317 to indicate that coherence state agnostic requests to bring the cache line into the cache should be converted to requests to bring the cache line into the cache in a shared state.

In some examples, an instance of unnecessarily bring a cache line into a cache in an exclusive state for a particular class occurs where the cache line is brought in in an exclusive state but is then removed or converted to a shared state before the cache line is written to. In some examples, the cache controller detects such an occurrence in the event that a cache line is brought into the cache line in an exclusive state and is then converted to a shared state (e.g., due to a read by a processor core 314 associated with a different, parallel cache) or an invalid state (e.g., due to another processor core 314 requesting the cache line in an exclusive or shared state, or due to a capacity eviction from the cache) before being converted to a modified state.

In some examples, the metadata memory 317 includes an entry for each possible class. Each entry either explicitly indicates the class the entry is associated (e.g., via a numerical label) or implicitly indicates that class the entry is associated with (e.g., based on position within the metadata memory 317). In some examples, the entry includes a count for each class (the decision factor), where the count indicates a number of times that the instance of unnecessarily bring a cache line into a cache in an exclusive state occurs for the associated class. The cache controller increments the count for a class when an instance of unnecessarily bringing a cache line into the cache in an exclusive state occurs. When the count is above a threshold, the entry is deemed to include an indication that coherence state agnostic requests should be downgraded to shared state requests for the class. When the count is not above the threshold, the entry is deemed to not include such an indication. Although a specific configuration of the metadata memory 317 is described, storing specific information, it should be understood that any of a variety of configurations are possible that include per-class indications of whether coherence state agnostic requests for the class should be downgraded to requests to bring the cache line in a shared state.

It should be understood that although specific units are described as performing specific actions, many variations are possible. In some examples, the processor cores 314 or another unit generate the memory accesses that result in the requests to insert a cache line in a cache. In some examples, the cache for the cache line to be insert is the core-level cache 316. In other examples, a different cache in the hierarchy is the cache in which the cache line exists. In some examples, a cache controller, which is not shown in FIG. 3, is the unit that monitors and updates the metadata memory, as well as the unit that downgrades the requests generated by the processor core 314. In some examples, the cache controller is the controller for the core-level cache 316, the cache controller for the processor chip level cache 312, or a different cache controller or unit. In some examples, the metadata memory 317 is stored with each core-level cache 316. In some examples, the metadata memory 317 is stored with each processor chip-level cache 312. In other examples, the metadata memory 317 is stored at any other location. In some examples, the cache controller is a hardware circuit, software executing on a processor, or a combination thereof, configured to perform the operations described herein.

Note that the metadata memory 317 maintains information on a class basis, but not on a cache line basis. Thus operations for different cache lines for the same cache affect the indication of whether to downgrade requests for a particular class. For example, if the above described threshold is 5, and 5 different cache lines have coherence states that change from exclusive to shared, then the cache controller causes the metadata memory 317 to indicate that requests for the class should be downgraded.

Figure 4A:
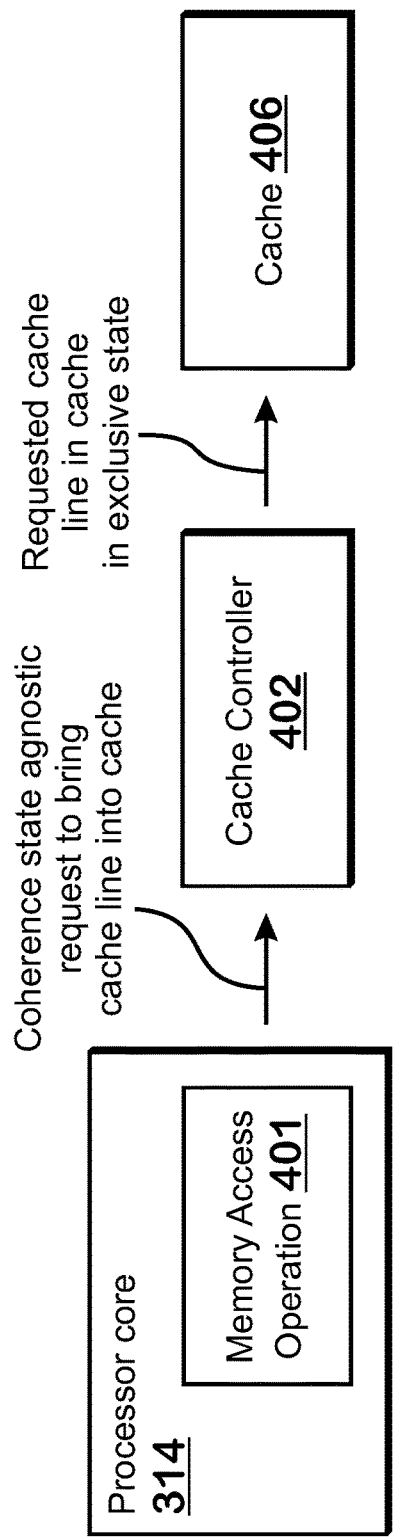
FIGS. 4A-4D illustrate example cache operations.

FIGS. 4A-4D illustrate operations associated with downgrading requests for cache lines. FIG. 4A illustrates an example operation in which cache lines are brought into the cache 406 in an exclusive state, in response to a coherence state agnostic request. The processor core 314 performs a memory access operation 401 which results in a cache miss in the cache 406. Subsequently, the processor core 314 transmits a coherence state agnostic request to the cache controller 402 to bring the cache line into the cache 406. In response to this request, the cache controller 402 brings the cache line in the cache 406 in an exclusive state. Note that it is possible for the cache controller 402 to bring cache lines into the cache 406 in other coherence states, but in the illustrated instance, the cache line is brought into the cache 406 in an exclusive state.

Figure 4B:
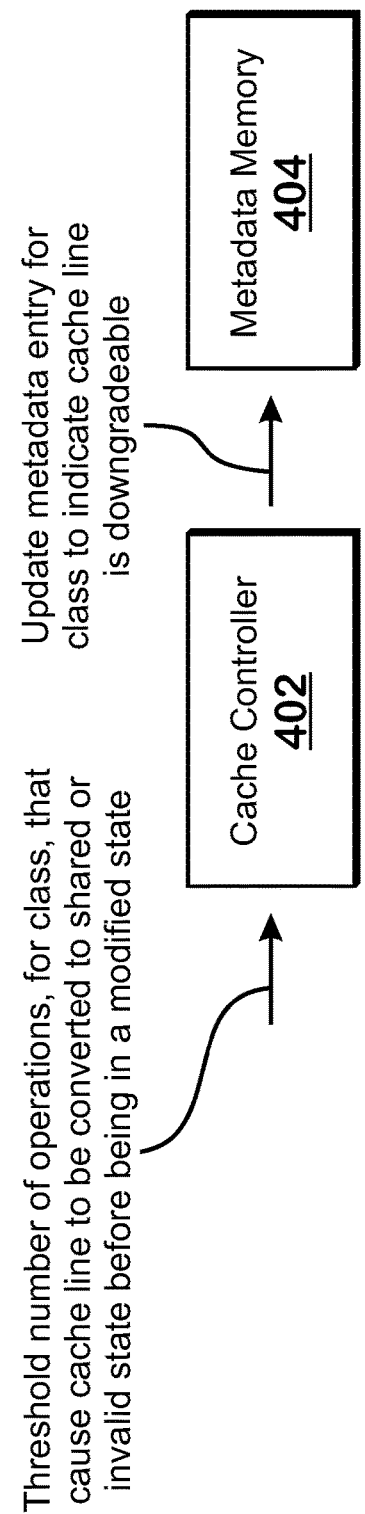

FIG. 4B illustrates an example operation in which metadata memory 404 is updated for a class to indicate that coherence state agnostic requests to insert cache lines into the cache 406 should be downgraded to requests to insert the cache lines into the cache 406 in a shared state. In FIG. 4B, the processor core 314 makes a threshold number of requests that cause the cache controller 402 to change the state of a cache line from an exclusive state to a shared or invalid state. This threshold number of requests occurs for a single class. It should be understood that this threshold number may occur over time, in response to many operations performed by one or more processor cores 314 or other entities. In response to the threshold number, the cache controller 402 includes an indication in the metadata memory 404 that coherence state agnostic requests for a particular class (the class for which the threshold number of requests occur) to fetch cache lines into the cache 406 should be downgraded to requests to fetch the cache lines into the cache in a shared state.

In some examples, each time the cache controller 402 determines that a cache line for a class becomes shared or invalid without becoming modified, the cache controller 402 increments a counter in the metadata memory 404 for the class. When the counter is above a threshold, the cache controller 402 interprets that counter as an indication to downgrade coherence state agnostic requests to requests for cache lines in a shared state.

Figure 4C:
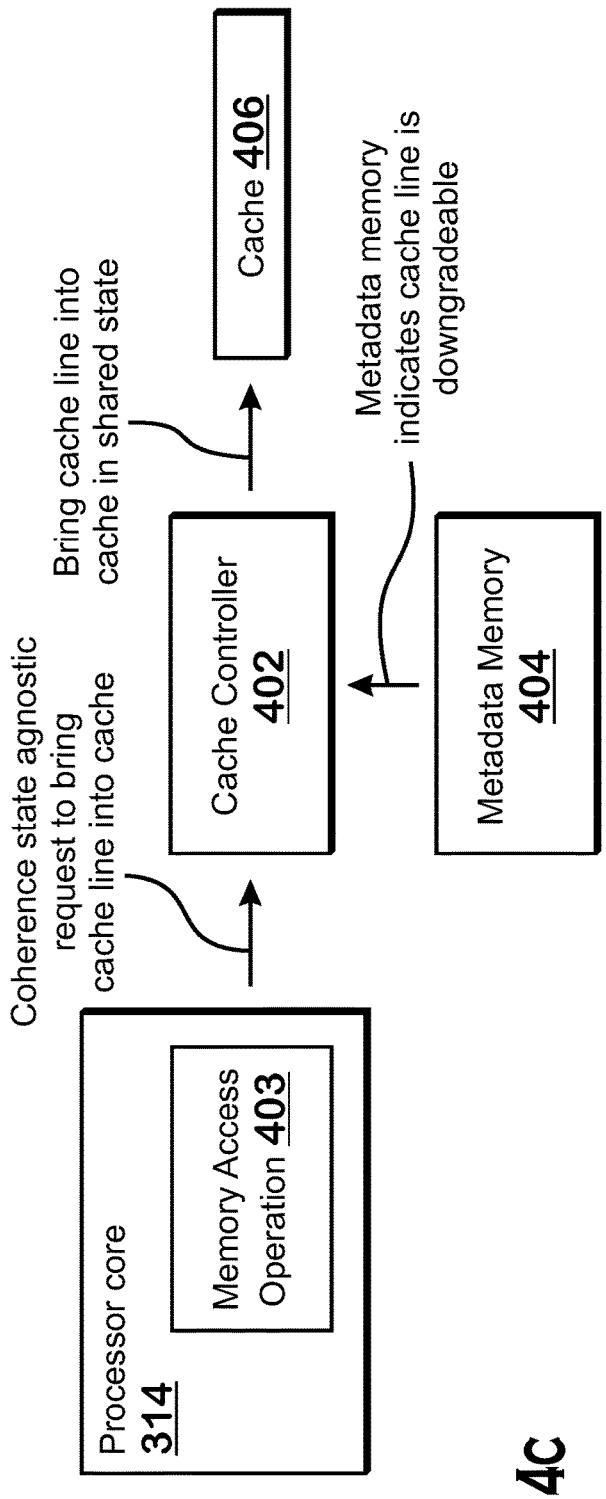

FIG. 4C illustrates an example operation for downgrading a coherence state agnostic request for a cache line into a request for the cache line in a shared state. Due to a memory access operation 403, the cache controller 402 receives a request, for a particular class, from a unit such as a processor core 314. The request is a coherence state agnostic request to bring a cache line into the cache 406. The cache controller 402 determines that the metadata memory 404 indicates that such requests for the particular class should be downgraded to a request to bring the cache line into the cache in a shared state 406. In response to this determination, the cache controller 402 causes the cache line to be brought into the cache 406 in a shared state.

Figure 4D:
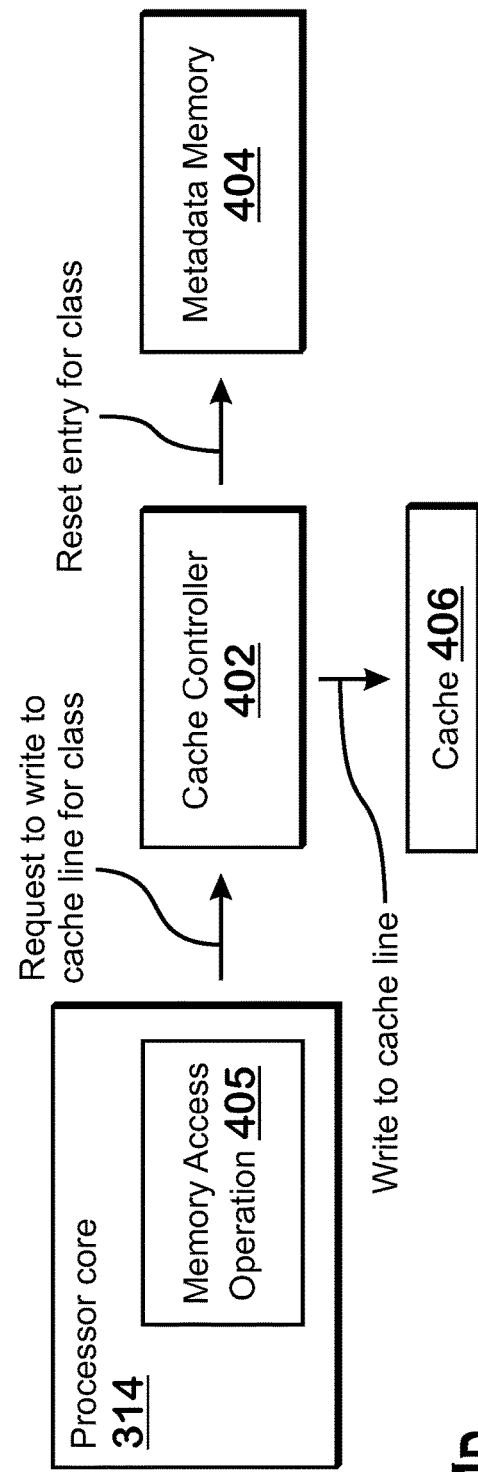

FIG. 4D illustrates an example operation for resetting the entry for a particular class, in response to a cache line in an exclusive state being converted to a modified state. A processor core 314 performs a write to a cache line for a memory access operation 405. In an example, the processor core 314 executes a store instruction, which results in a write to a cache line. The cache line that is written to is in an exclusive state, and the write occurs with a particular class (e.g., with a particular combination of thread ID and access type). The cache controller 402 updates the metadata memory to indicate that, for the class, metadata state agnostic requests to insert cache lines into the cache 406 should not be downgraded to requests to insert cache lines into the cache in a shared state. Subsequent to this, and while the metadata memory includes this indication, requests to insert cache lines into the cache 406 for the class are satisfied by either storing the cache line in an exclusive state or a shared state.

Figure 5:
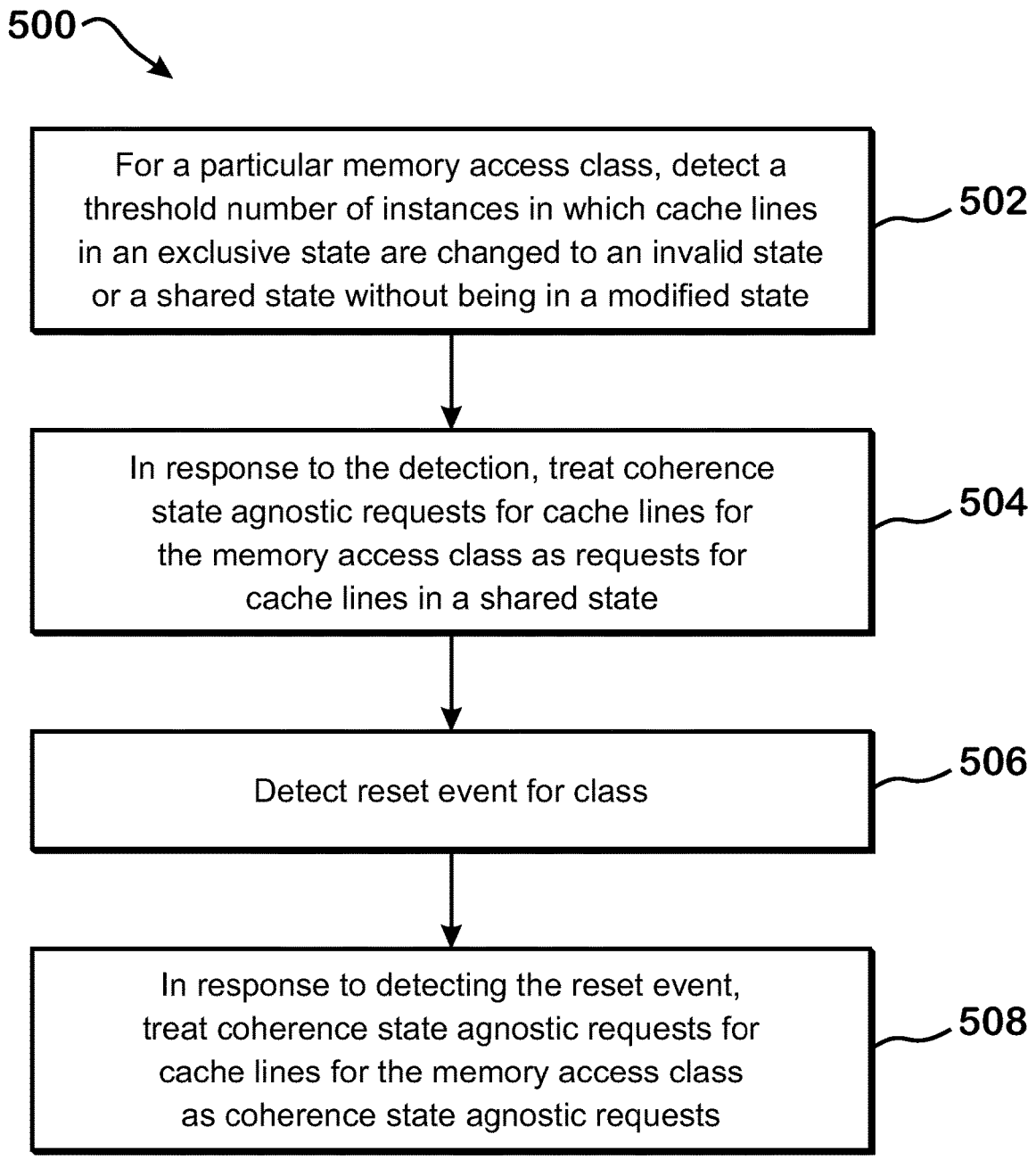
FIG. 5 is a flow diagram of a method for performing cache operations, according to an example.

FIG. 5 is a flow diagram of a method 500 for performing cache operations, according to an example. Although described with respect to the system of FIGS. 1-4D, those of skill in the art will understand that any system, configured to perform the steps of the method 500 in any technically feasible order, falls within the scope of the present disclosure.

At step 502, for a particular memory access class, a cache controller detects a threshold number of instances in which caches lines in an exclusive state are changed to an invalid or shared state without being in a modified state. In some examples, cache lines are brought into the cache in response to a miss. In some examples, the miss occurs due to an instruction executed by a processor core 314. In some examples, cache lines are brought into the cache in response to a prefetch request. In some examples, instructions or operations that result in bringing the cache line into the cache in an exclusive state do not necessarily need that cache line in an exclusive state, but the cache controller brings the cache line in that state. In some instances, when such a cache line is in an exclusive state and the cache line is invalidated or converted into a shared state, bringing the cache line in in an exclusive state can be considered unnecessary.

In some examples, the detection occurs as a detection that a count of the number of such instances is above a threshold. In some examples, this count is stored in a metadata memory 404. Each time the cache controller detects that a cache line in an exclusive state is changed to an invalid state or a shared state without being in a modified state, the cache controller increments the count. In some examples, the metadata memory 404 stores such a count on a per class basis.

At step 504, the cache controller, in response to the detection, treats coherence state agnostic requests for cache lines to be inserted into the cache, for the memory access class, as requests for cache lines in a shared state. In some examples, performing this step includes bringing the cache line into the cache in a shared state in any situation that results in the processor core 314 (or other entity) generating a coherence state agnostic request. In various examples, load instructions or prefetches result in coherence state agnostic requests. In some examples, such operations result in a coherence state agnostic request, but in the event that the detection of step 502 occurs, these requests are converted to a request for the cache line in a shared state.

At step 506, the cache controller detects a reset event for the class. In some examples, a reset event includes a detection that, for the class, a cache line is brought into the cache in an exclusive state and is subsequently modified. At step 508, in response to the reset event, the cache controller treats coherence state agnostic requests normally. In an example, the cache controller is free to bring cache lines into the cache in response to such requests in either a shared or an exclusive state. Thus, in some examples, after this reset event (or before detection of the threshold number of instances described in step 502), the cache controller bring one cache line in an exclusive state in response to a state agnostic request and brings another cache line in in a shared state in response to a state agnostic request.

It should be understood that many variations are possible based on the disclosure herein. Although features and elements are described above in particular combinations, each feature or element may be used alone without the other features and elements or in various combinations with or without other features and elements.

The various elements illustrated in the Figures are implementable as hardware (e.g., circuitry), software executing on a processor, or a combination of hardware and software. In various examples, each block, such as the processor chips 310, the system elements 308, system level memories 304, system memory controller 306, processor chip-level caches 312, processor set memory 320, processor core 314, core-level caches 316, and metadata memory 317, the cache controller 402, the metadata memory 404, and the cache 406, and the illustrated units of the instruction execution pipeline 200 and the computer system 100, are implementable as hardware (e.g., a hardware processor and/or a circuit), software, or a combination thereof. The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
    for a memory access class, detecting at least a threshold number of instances in which cache lines in an exclusive state in a cache are changed to an invalid state or a shared state without being in a modified state;
    in response to the detecting, treating first coherence state agnostic requests for cache lines for the memory access class as requests for cache lines in a shared state;
    detecting a reset event for the memory access class; and
    in response to detecting the reset event, treating second coherence state agnostic requests for cache lines for the memory access class as coherence state agnostic requests.

2. The method of claim 1, further comprising:
    maintaining a count of a number of instances in which cache lines in an exclusive state in a cache are changed to an invalid state or a shared state without being in a modified state.

3. The method of claim 2, further comprising:
    in response to the reset event, resetting the count to zero.

4. The method of claim 1, wherein the reset event includes detecting that a cache line in an exclusive state is converted to a cache line in a shared state, for the memory access class.

5. The method of claim 1, further comprising:
    storing cache lines into the cache in an exclusive state in response to one or more of load instructions and prefetch operations.

6. The method of claim 1, wherein the memory access class is defined as a combination of memory access type and thread identifier.

7. The method of claim 1, wherein treating the first coherence state agnostic requests for cache lines for the memory access class as requests for cache lines in a shared state comprises, in response to a coherence state agnostic request to insert a cache line into the cache, storing the cache line in the cache in a shared state.

8. The method of claim 1, further comprising, for different memory access classes, tracking different numbers of instances in which cache lines in an exclusive state in a cache are changed to an invalid state or a shared state without being in a modified state.

9. The method of claim 8, further comprising for multiple different memory access classes, independently responding to requests for cache lines according to the number of instances in which cache lines in an exclusive state in a cache are changed to an invalid state or a shared state without being in a modified state.

10. A system, comprising:
    a cache; and
    a cache controller configured to:
        for a memory access class, detect at least a threshold number of instances in which cache lines in an exclusive state in the cache are changed to an invalid state or a shared state without being in a modified state;

in response to the detecting, treat first coherence state agnostic requests for cache lines for the memory access class as requests for cache lines in a shared state;

detect a reset event for the memory access class; and in response to detecting the reset event, treat second coherence state agnostic requests for cache lines for the memory class as coherence state agnostic requests.

11. The system of claim 10, wherein the cache controller is further configured to:

maintain a count of a number of instances in which cache lines in an exclusive state in a cache are changed to an invalid state or a shared state without being in a modified state.

12. The system of claim 11, wherein the cache controller is further configured to:

in response to the reset event, reset the count to zero.

13. The system of claim 10, wherein the reset event includes detecting that a cache line in an exclusive state is converted to a cache line in a shared state, for the memory access class.

14. The system of claim 10, wherein the cache controller is further configured to:

store cache lines into the cache in an exclusive state in response to one or more of load instructions and prefetch operations.

15. The system of claim 10, wherein the memory access class is defined as a combination of memory access type and thread identifier.

16. The system of claim 10, wherein treating the first coherence state agnostic requests for cache lines for the memory access class as requests for cache lines in a shared state comprises, in response to a coherence state agnostic request to insert a cache line into the cache, storing the cache line in the cache in a shared state.

17. The system of claim 10, wherein the cache controller is further configured to, for different memory access classes, track different numbers of instances in which cache lines in an exclusive state in a cache are changed to an invalid state or a shared state without being in a modified state.

18. The system of claim 17, wherein the cache controller is further configured to, for multiple different memory access classes, independently respond to requests for cache lines according to the number of instances in which cache lines in an exclusive state in a cache are changed to an invalid state or a shared state without being in a modified state.

19. A system, comprising:

a processor;

a cache; and a cache controller configured to:

for a memory access class, detect at least a threshold number of instances in which cache lines in an exclusive state in the cache are changed to an invalid state or a shared state without being in a modified state;

in response to the detecting, treat first coherence state agnostic requests for the processor for cache lines for the memory access class as requests for cache lines in a shared state;

detect a reset event for the memory access class; and in response to detecting the reset event, treat second coherence state agnostic requests for the processor for cache lines for the memory class as coherence state agnostic requests.

20. The system of claim 19, wherein the cache controller is further configured to:

maintain a count of a number of instances in which cache lines in an exclusive state in a cache are changed to an invalid state or a shared state without being in a modified state.

* * * * *